(12) United States Patent
Hartwich et al.

(10) Patent No.: US 10,334,089 B2
(45) Date of Patent: Jun. 25, 2019

(54) METHOD FOR SERIALLY TRANSMITTING A FRAME FROM A TRANSMITTER TO AT LEAST ONE RECEIVER VIA A BUS SYSTEM, AND A SUBSCRIBER STATION FOR A BUS SYSTEM

(71) Applicant: Robert Bosch GmbH, Stuttgart (DE)

(72) Inventors: Florian Hartwich, Reutlingen (DE); Martin Heinebrodt, Stuttgart (DE); Christian Horst, Dusslingen (DE); Thomas Lindenkreuz, Reutlingen (DE); Peter Svejkovsy, Renningen (DE); Arthur Mutter, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 15/508,258

(22) PCT Filed: Aug. 4, 2015

(86) PCT No.: PCT/EP2015/067930
§ 371 (c)(1),
(2) Date: Mar. 2, 2017

(87) PCT Pub. No.: WO2016/034350
PCT Pub. Date: Mar. 10, 2016

(65) Prior Publication Data
US 2017/0289321 A1 Oct. 5, 2017

(30) Foreign Application Priority Data
Sep. 3, 2014 (DE) .......... 10 2014 217 587
May 20, 2015 (DE) .......... 10 2015 209 201

(51) Int. Cl.
*H04L 29/08* (2006.01)
*H04L 1/00* (2006.01)
(Continued)

(52) U.S. Cl.
CPC .......... *H04L 69/324* (2013.01); *H04L 1/0008* (2013.01); *H04L 1/009* (2013.01);
(Continued)

(58) Field of Classification Search
CPC ..... H04L 69/324; H04L 12/407; H04L 1/009; H04L 1/0045; H04L 1/0041;
(Continued)

(56) References Cited

U.S. PATENT DOCUMENTS 7,180,851 B1 * 2/2007 Engel .................. H04L 1/00
370/216
2004/0059967 A1 * 3/2004 Kleppel .............. H04L 12/4013
714/52

(Continued)

FOREIGN PATENT DOCUMENTS

WO WO-2013020781 A1 * 2/2013 ......... G06F 13/4282

OTHER PUBLICATIONS

International Search Report corresponding to PCT Application No. PCT/EP2015/067930, dated Nov. 25, 2015 (German and English language document) (5 pages).

(Continued)

*Primary Examiner* — Tejis Daya
(74) *Attorney, Agent, or Firm* — Maginot, Moore & Beck LLP

(57) ABSTRACT

The disclosure relates to a method for serially transmitting a frame from a transmitter to at least one receiver via a bus line, as well as a subscriber station for a bus system. According to said method, stuff bits for generating additional signal edges are inserted into the frame by the transmitter according to a predetermined rule, and the stuff bits are removed again by the receiver when evaluating a received frame, a CRC calculation logic of a CRC generator calculating a CRC checksum that is comprised by said (Continued)

frame, and a value of "1" being inserted into said CRC calculation logic in an additional evaluation step if a value of "0 . . . 0" has been determined for the CRC checksum in the running calculation executed by the CRC calculation logic.

7 Claims, 4 Drawing Sheets

(51) Int. Cl.
    *H04L 12/40*     (2006.01)
    *H04L 12/413*     (2006.01)
    *H04L 12/407*     (2006.01)

(52) U.S. Cl.
    CPC .......... *H04L 1/0041* (2013.01); *H04L 1/0045* (2013.01); *H04L 1/0061* (2013.01); *H04L 1/0083* (2013.01); *H04L 1/0091* (2013.01); *H04L 12/407* (2013.01); *H04L 12/40013* (2013.01); *H04L 12/4135* (2013.01); *H04L 2001/0094* (2013.01); *H04L 2012/40215* (2013.01); *H04L 2012/40273* (2013.01)

(58) Field of Classification Search
CPC ... H04L 1/0008; H04L 1/0061; H04L 1/0083; H04L 12/4135; H04L 12/40013; H04L 1/0091; H04L 2012/40215; H04L 2001/0094; H04L 2012/40273
See application file for complete search history.

(56) References Cited

U.S. PATENT DOCUMENTS

| | | |
|---|---|---|
| 2004/0081079 A1 | 4/2004 | Forest et al. |
| 2010/0241936 A1* | 9/2010 | Hirth ................... H03M 13/091 714/807 |
| 2014/0223258 A1* | 8/2014 | Hartwich ............ G06F 13/4282 714/758 |

OTHER PUBLICATIONS

Robert Bosch GmbH; CAN with Flexible Data-Rate; Apr. 17, 2012; 32 Pages; Version 1.0; Robert Bosch GmbH, Gerlingen, Germany.

* cited by examiner

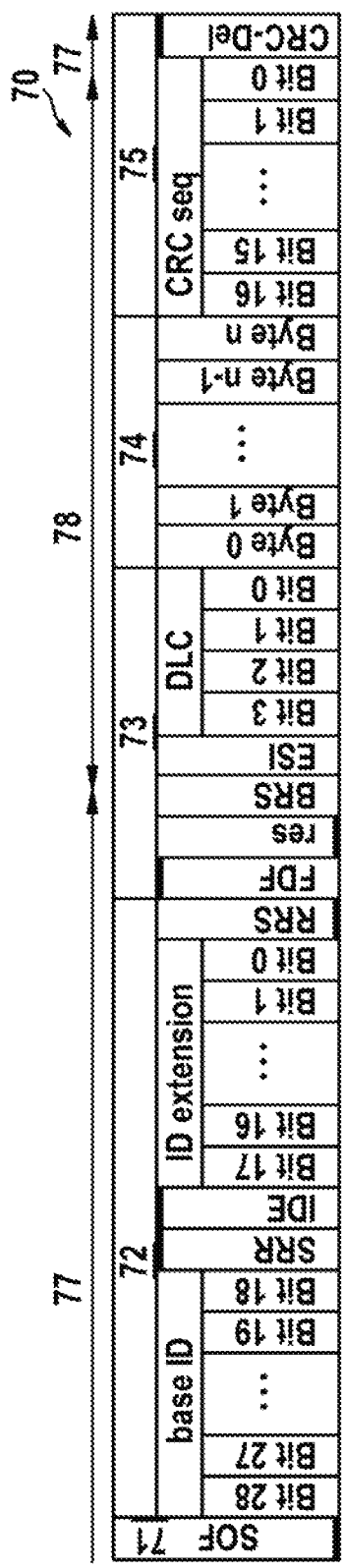
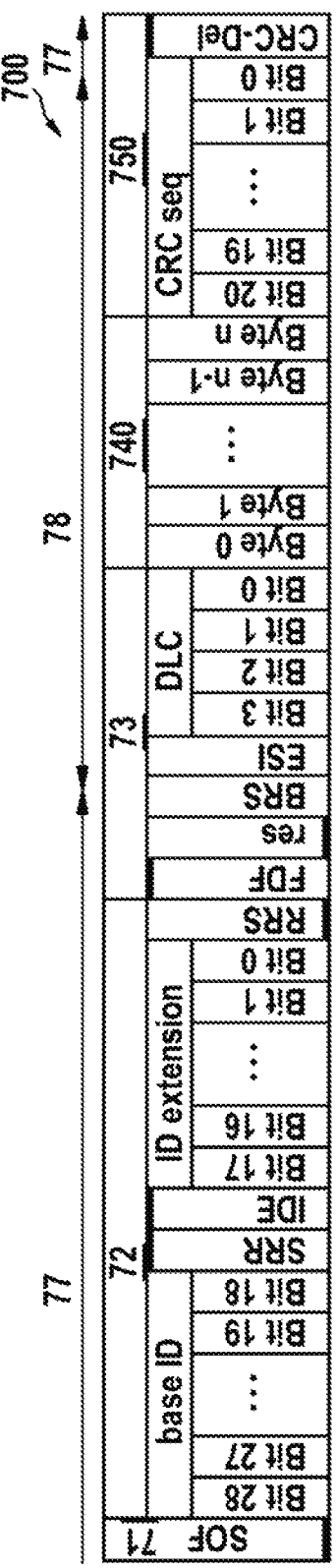
Fig. 5
Fig. 6

METHOD FOR SERIALLY TRANSMITTING A FRAME FROM A TRANSMITTER TO AT LEAST ONE RECEIVER VIA A BUS SYSTEM, AND A SUBSCRIBER STATION FOR A BUS SYSTEM

This application is a 35 U.S.C. § 371 National Stage Application of PCT/EP2015/067930, filed on Aug. 4, 2015, which claims the benefit of priority to Serial Nos. DE 10 2014 217 587.9 filed on Sep. 3, 2014 and DE 10 2015 209 201.1 filed on May 20, 2015, in Germany, the disclosures of which are incorporated herein by reference in their entirety.

BACKGROUND

For communication between sensors and control devices in vehicles, in particular automobiles, the CAN bus system may be used for example. In the case of the CAN bus system, messages are transmitted by means of the CAN and/or CAN FD protocol, as described in the current Committee Draft of ISO11898-1 or the specification "CAN with Flexible Data-Rate, Specification Version 1.0 (released Apr. 17, 2012)" as the CAN Protocol Specification with CAN FD.

After an initial Start of Frame bit (SOF bit) with a dominant level, which signals the beginning of the frame, CAN FD messages or frames have a bit 28 to bit 18, and possibly also a bit 17 to bit 0, for an identifier of the CAN FD frame. Therefore, the bit 28 to bit 0 is also referred to as ID28, ID27, etc.

A weakness has been found in methods for carrying out a CRC (CRC=Cyclic Redundancy Check) of the CAN FD frames. The weakness only concerns FD frames with an identifier that begins with four dominant hits. These four dominant bits, together with the dominant Start of Frame bit, generate a stuff condition, on the basis of which a recessive stuff bit is inserted between the fourth and fifth identifier bits. By this predetermined rule for inserting the stuff bits it is possible to prevent that bit sequences with more than five identical bits are mistakenly interpreted as signaling an End of Frame, for example, or that the absence of signal edges or changes of level between the bits causes the bus subscribers to lose synchronization. This is so because, in the case of CAN and CAN FD, signal edges or changes of level are used for synchronizing the bus subscribers.

If in the aforementioned case of the four dominant bits the leading dominant Start of Frame bit is overwritten with a recessive bit (locally in a receiver), this receiver interprets the first dominant identifier bit as the Start of Frame bit. There is no stuff condition in the receiver if it receives the recessive stuff bit, and so the receiver will accept the recessive stuff bit as the fourth identifier bit. The following bit is accepted as the fifth identifier bit and the receiver will be in phase again with the transmitter.

The weakness is that in this case the CRC test will not include the changed fourth identifier bit; a sent identifier of for example 0x001 is received as 0x081. This occurs if the identifier begins with four dominant '0' bits and the dominant Start of Frame bit is overwritten. The resultant consequence will be that the fourth identifier bit is received as '1' instead of '0'. Affected by this are both 11-bit identifiers, such as in the case of CAN FD frames in the base format, and 29-bit identifiers, such as in the case of CAN FD frames in the extended format, and both CAN FD frames with the 17-bit CRC or CRC-17 and CAN FD frames with the 21-bit CRC or CRC-21.

Frames in the classical CAN format are not affected by the problem, since with them the stuff bits are excluded from the CRC calculation.

The weakness of the CRC method is caused by the initialization vector of '00000000000000000' for the CRC generator. The first leading '0' bit will not change the CRC generator register, and so is not sensed by the CRC test if there is one bit fewer before the first recessive bit in the arbitration field (the sent stuff bit, which is regarded by the receiver with the bit error as the fourth identifier bit).

Furthermore, the absent bit at the beginning of the frame is not sensed as a format error, since the stuff bit is accepted as the missing identifier bit.

To sum up, this means:

In the case of classical CAN, stuff bits are not taken into consideration for the CRC generation. Only pairs of bit-error generation/elimination stuff conditions can reduce the Hamming distance (HD) to 2.

In the case of CAN FD with the longer CRC checksums (CRC-17 and CRC-21), stuff bits are included in the CRC generation. A problem may arise if the Start of Frame bit is falsified by the receiver.

In the following two cases, it may happen that the CRC of the CAN FD frame does not sense a falsified identifier. This means that the receiver accepts the falsified frame as a valid frame.

Case 1a: Transmitter Sends ID28–ID25="0000"

If the receiver senses a shortened Start of Frame bit, identifiers that begin with 1028–ID25="0000" may be falsified as ID28-ID25="0001". The reason for this is that the receiver does not detect the Start of Frame, or detects it too late, and therefore interprets ID28 as the Start of Frame. Consequently, on account of the stuff bit inserted by the transmitter after ID25, the first four identifier bits are falsified as ID28–ID25="0001"; all the subsequent identifier bits are received correctly. The transmitter does not detect any error when reading back the Start of Frame from the bus.

The required shortening depends on the CAN clock frequency relationship between the transmitter and the receiver. Cf. the examples for details.

The falsified bus signal may contain dominant disturbance pulses, as long as they are not sensed by the receiving CAN node.

If, for example, the CAN clock in the subscriber stations or nodes is fRX_node=fTX_node, then a shortening/falsification of the Start of Frame bit of "phase_seg2+ε" is enough to cause the problem. With 1 Mbit/s and a sample point (SP) of 80%, a shortening by 250 ns is enough to create the problem. This is explained still more precisely later on the basis of FIG. 7.

Case 1b: Transmitter Sends ID28–ID25="0001"

If, on the other hand, for example due to a dominant disturbance pulse, the receiver senses a dominant bit in the bit time before the sent Start of Frame bit arrives, identifiers that begin with ID28–ID25="0001" may be falsified as ID28–ID25="0000". The reason for this is that the receiver detects the Start of Frame bit sent by the transmitter as ID28. As a result, the receiver misinterprets the "1" as a stuff bit and removes it. Consequently, the first four identifier bits are falsified as ID28–ID25="0000". All of the subsequent identifier bits are received correctly.

To sum up, Table 1 shows how the two critical values of the identifier bits ID28 to ID25 of "0000" and "0001" must be falsified on the way to the receiver in order that the error is not detected by the CRC of the receiver.

TABLE 1

| Sent | | | | | Received | | | |
|---|---|---|---|---|---|---|---|---|
| ID28 | ID27 | ID26 | ID25 | | ID28 | ID27 | ID26 | ID25 |
| 0 | 0 | 0 | 0 | → | 0 | 0 | 0 | 1 |
| 0 | 0 | 0 | 1 | → | 0 | 0 | 0 | 0 |

A comparable situation may also arise within a CAN FD frame if a recessive bit after a series of four sent dominant bits is misinterpreted by the receiver as a stuff bit because of a shortening of a bit or a shift in the synchronization of the subscribers and at the same time the interim CRC register value is coincidentally equal to "0 . . . 0". The interim CRC register value is the value of the CRC checksum that is respectively present in the CRC register provided for it. With each bit sent or received before the CRC field in the transmitter or receiver, the content of the CRC register is newly calculated in accordance with the specification of the respectively used CRC polynomial. The content of the register present at the last bit of the data field is then sent in the CRC field of the message from the transmitter to the receiver for testing.

SUMMARY

Therefore, the object of the present disclosure is to provide a method for the serial transmission of a frame from a transmitter to at least one receiver via a bus system and a subscriber station for a bus system which method and which subscriber station solve the aforementioned problems. In particular, it is intended to provide a method for the serial transmission of a frame from a transmitter to at least one receiver via a bus system and a subscriber station for a bus system with which the reliability of the data transmission between subscribers of a bus system is further increased in comparison with previous methods.

The object is achieved by a method for the serial transmission of a frame from a transmitter to at least one receiver via a bus line with the features according to the disclosure. In the method, stuff bits are inserted into the frame by the transmitter according to a predetermined rule to generate additional signal edges, the stuff bits being removed again by the receiver in an evaluation of the frame received, a CRC calculation logic of a CRC generator calculating a CRC checksum, which the frame comprises, and a value "1" being inserted into the CRC calculation logic in an additional evaluation step if in the continuous calculation carried out by the CRC calculation logic a value of "0 . . . 0" is found for the CRC checksum.

The disclosure describes a method of allowing the CRC algorithm to be extended in order in the event of erroneous sampling that misinterprets a stuff bit to reliably detect this error.

The advantage lies in the reliable detection of bit errors in the event of incorrect sampling.

The use of the described method can be demonstrated on the one hand by the datasheet/handbook of the CAN protocol controller, on the other hand by the behavior of the controller or the communication control device in the network or bus system. The CAN FD protocol variant described here is intended to be used for CAN and for TTCAN networks or bus systems.

Advantageous further refinements of the method are specified in the embodiments of the disclosure.

It is possible that the additional evaluation step is carried out before the evaluation of the next transmitted bit.

In a special refinement, an initialization vector of the CRC checksum may have the value "1 . . . 0".

The frame possibly has a header part, a data part and an end part, and/or it is possible that the header part has an identifier.

It is also possible that the frame is a CAN frame or a TTCAN frame or a CAN FD frame.

The previously stated object is also achieved by a subscriber station for a bus system according to the disclosure. The subscriber station comprises a transmitting/receiving device for transmitting a frame to and/or receiving a frame from a further subscriber station of the bus system, with which the frame can be transmitted from a transmitter to at least one receiver by means of serial transmission via a bus line, and comprises a verifying device for verifying a CRC checksum of the frame, which is to be calculated by a CRC calculation logic of a CRC generator, the transmitting/receiving device being designed so as, before sending a frame, to insert stuff bits into the frame according to a predetermined rule to generate additional signal edges and/or so as, when evaluating a received frame, to remove the stuff bits again, the verifying device being designed so as to insert a value "1" into the CRC calculation logic in an additional evaluation step if in the continuous calculation carried out by the CRC calculation logic a value of "0 . . . 0" is found for the CRC checksum . . . .

The subscriber station may be part of a bus system, which also has a bus line and at least two subscriber stations, which can be connected to one another via the bus line in such a way that they can communicate with one another, at least one of the at least two subscriber stations being the subscriber station described above.

Further possible implementations of the disclosure also comprise not explicitly mentioned combinations of features or embodiments that are described above or below with respect to the exemplary embodiments. At the same time, a person skilled in the art will also add individual aspects as improvements or supplements to the respective basic form of the disclosure.

BRIEF DESCRIPTION OF THE DRAWINGS

The disclosure is described in more detail below on the basis of exemplary embodiments and with reference to the accompanying drawing, in which:

FIG. 3 to FIG. 6 respectively show the format of CAN FD frames with the placement of the first four identifier bits (ID28-ID25) according to the current Committee Draft of ISO11898-1.

Unless otherwise stated, in the figures elements that are the same or functionally the same are provided with the same reference signs.

DETAILED DESCRIPTION

Figure 1:
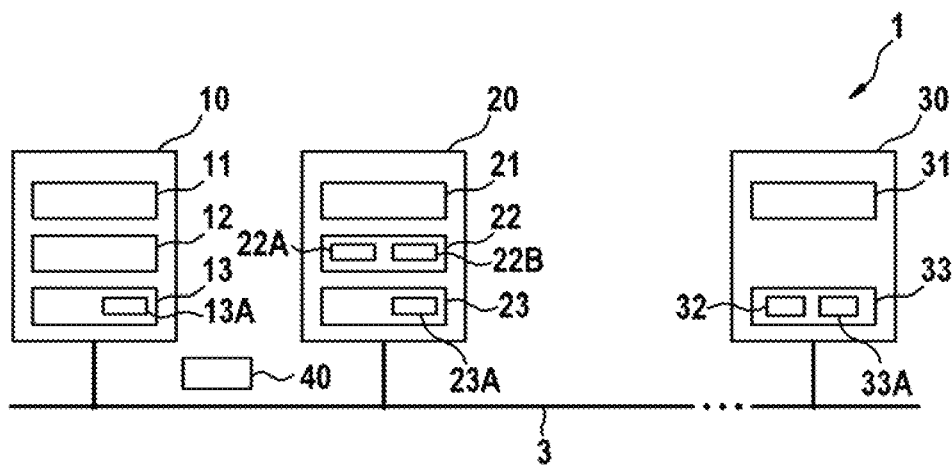
FIG. 1 shows a simplified block diagram of a bus system according to a first exemplary embodiment.

FIG. 1 shows in a first exemplary embodiment a bus system 1, which may for example be a CAN FD bus system. The bus system 1 may be used in a vehicle, in particular a motor vehicle, an aircraft, etc., or in a hospital etc.

In FIG. 1, the bus system 1 has a bus line 3, to which a multiplicity of subscriber stations 10, 20, 30 are connected. Via the bus line 3, frames 40 can be transmitted in the form of signals between the individual subscriber stations 10, 20, 30. The subscriber stations 10, 20, 30 may be for example control devices, sensors, display devices, etc. of a motor vehicle or else industrial control installations.

As shown in FIG. 1, the subscriber station 10 has a communication control device 11, a verifying device 12 and a transmitting/receiving device 13, which has a CRC generator 13A. It goes without saying that the verifying device 12 may also be part of the communication control device 11. By contrast, the subscriber station 20 has a communication control device 21, a verifying device 22 with a CRC evaluation unit 22A and an insertion unit 22B, and a transmitting/receiving device 23, which has a CRC generator 23A. The subscriber station 30 has a communication control device 31, a verifying device 32 and a transmitting/receiving device 33, which has the verifying device 32 and a CRC generator 33A. The transmitting/receiving devices 13, 23, 33 of the subscriber stations 10, 20, 30 are respectively connected directly to the bus line 3, even if this is not represented in FIG. 1.

The communication control devices 11, 21, 31 respectively serve for controlling a communication of the respective subscriber station 10, 20, 30 via the bus line 3 with another subscriber station of the subscriber stations 10, 20, 30 connected to the bus line 3. The communication control devices 11, 21, 31 may be respectively configured like a conventional CAN or TTCAN or CAN FD controller. The communication control devices 11, 21, 31 may also be respectively formed as part of a microcontroller, which is likewise comprised by the respective subscriber station 10, 20, 30.

The transmitting/receiving devices 13, 23, 33 may be respectively configured like a conventional CAN or TTCAN or CAN FD transceiver.

The verifying devices 12, 22, 32 may also be configured as software modules, which form part of the software running on the subscriber station. In this case, the method according to the present disclosure is fully implemented in software.

Figure 2:
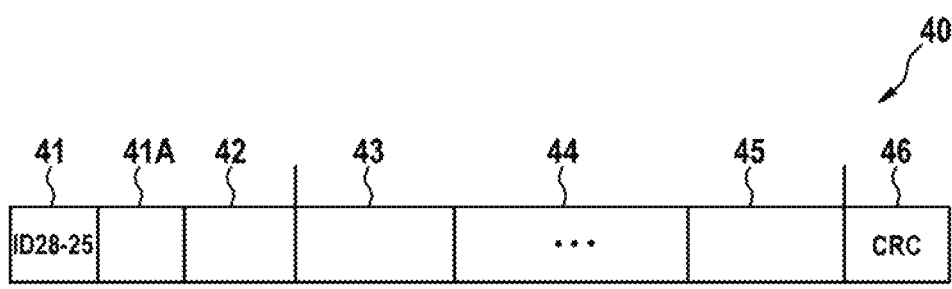
FIG. 2 shows a schematic representation of a structure of a frame in the case of the bus system according to FIG. 1.

FIG. 2 shows very schematically the structure of frame 40 without the Start of Frame bit (SOF), which is transmitted directly before the frame 40 via the bus line 3. The frame 40 may be a CAN frame or a TTCAN frame.

In FIG. 2, the frame 40 has a header part 41, 41A, 42, a data field 43, 44, 45, and also an end part 46, which forms the end of the frame. The header part 41, 51A, 42 has in a first segment 41 the first four bits of the identifier (ID) 41, 41A, in a second segment 41A the remaining bits of the identifier 41, 41A and a control field 42. The data field. 43, 44, 45 has in a first part 43 a byte 0, in a second part 44 further bytes and in a third part 45 a byte n. In the end part 46, a CCR checksum is provided.

Figure 3:
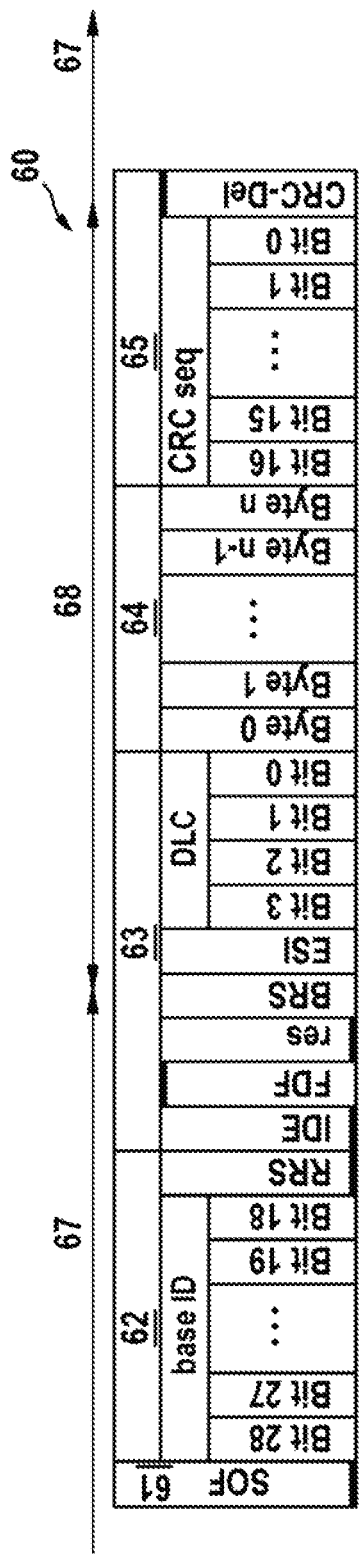

FIG. 3 shows a frame 60 sent by one of the subscriber stations 10, 20, 30 with up to 16 data bytes in the CAN FD base format. The frame 60 has an SOF bit 61 and also a number of frame fields, such as an arbitration field. 62, a control field 63, a data field 64 and a checksum field 65 (CRC field). The arbitration field 62 comprises in the base ID field an identifier of the frame 60. Arranged at the end of the arbitration field 62 is an RRS bit. The control field 63 begins with an IDE bit, which is followed by an FDF bit and then by a res bit and a then-following ERS bit and then an ESI bit, which is followed by a DLC field. The data field 64 is not present if the DLC field of the control field 63 has the value 0. The checksum field 65 contains in a CRC-seq field a CRC checksum and ends with a then-following CRC delimiter CRC-Del. The fields and bits mentioned are known from ISO-CD-11898-1, and are therefore not described in more detail here.

In FIG. 3, the length of an arbitration phase 67 in the case of the present exemplary embodiment is indicated. The arbitration phase 67 is followed by the data phase 68 if the ERS bit in the frame 60 is recessive. The frame 60 has a header part 61 to 63, a data part 64 and an end part 65.

In FIG. 3 to FIG. 6, dominant bits are represented by a broad line at the lower edge of the frame 60. Recessive bits are represented in FIG. 3 to FIG. 6 by a broad line at the upper edge of the frame 60.

As shown in FIG. 3, the associated communication control device 11, 21, 31 of the transmitter has created the frame 60 in such a way that the SOF bit, the RRS bit, the IDE bit and the res bit are dominant, whereas the FDF bit and the CRC delimiter CRC-Del are recessive.

Figure 4:
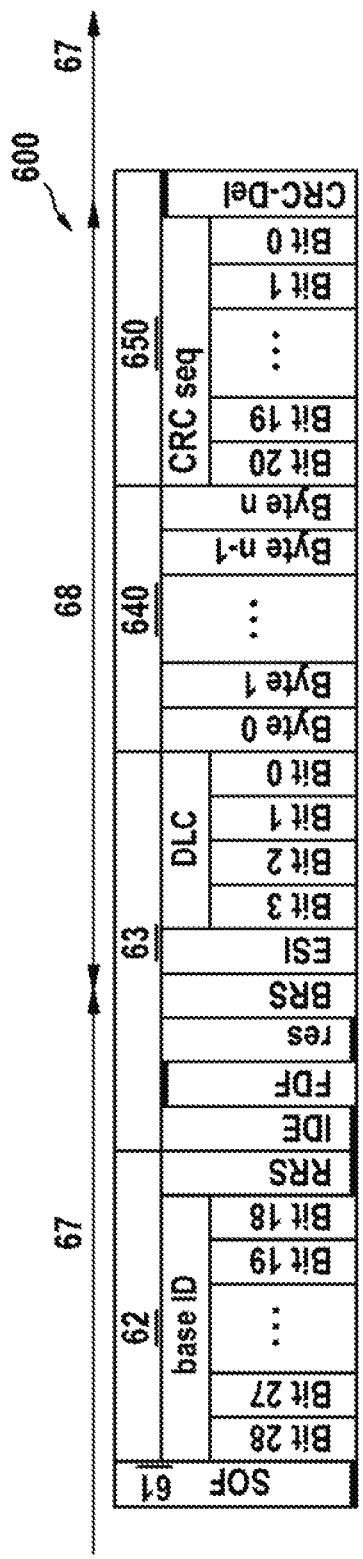

FIG. 4 shows a frame 600 sent by one of the subscriber stations 10, 20, 30, with more than 16 data bytes in the CAN FD base format. The frame 600 is constructed in the same way as the frame 60 from FIG. 3 apart from a longer data field 640 in comparison with the data field 64 and a longer checksum field 650 in comparison with the checksum field 65. The frame 600 has a header part 61 to 63, a data part 640 and an end part 650.

FIG. 5 shows a frame 70 sent by one of the subscriber stations 10, 20, 30, with up to 16 data bytes in the CAN FD extended format. According to FIG. 5, the frame 70 has an SOF bit 71 and also a number of frame fields, such as an arbitration field 72, a control field 73, a data field 74 and a checksum field 75 (CRC field). The arbitration field 72 comprises in the base-ID field and the ID-ext field an identifier of the frame 70. Provided between the base-ID field and the ID-ext field are an SRR bit and an IDE bit. Arranged at the end of the arbitration field 72 is an RRS bit. The control field 73 begins with an FDF bit, followed by a res bit. There then follows a DSR bit and an ESI bit. The control field 73 ends with the DLC field. The data field 74 is not present if the DLC field of the control field 73 has the value 0. Otherwise, the frame 70 is constructed in the same way as the frame 60 from FIG. 3 and has a corresponding arbitration phase 77 and data phase 78. The frame 70 has a header part 71 to 73, a data part 74 and an end part 75.

As shown in FIG. 5, the associated communication control device 11, 21, 31 of the transmitter has created the frame 70 in such a way that the SOF bit, the RRS bit and the res bit are dominant, whereas the SRR bit, the IDE bit and the CRC delimiter CRC-Del are recessive.

FIG. 6 shows a frame 700 sent by one of the subscriber stations 10, 20, 30, with more than 16 data bytes in the CAN FD extended format. The frame 700 is constructed in the same way as the frame 70 from FIG. 5 apart from a longer data field 740 in comparison with the data field 74 and a longer checksum field 750 in comparison with the checksum field 75. The frame 700 has a header part 71 to 73, a data part 740 and an end part 750.

For CAN FD frames 60, 600 in the base format, which are shown in FIG. 3 and FIG. 4, the CRC checksum is referred to as CRC-17. For CAN FD frames 70, 700 in the extended format, which are shown in FIG. 5 and FIG. 6, the CRC checksum is referred to as CRC-21.

Figure 7:
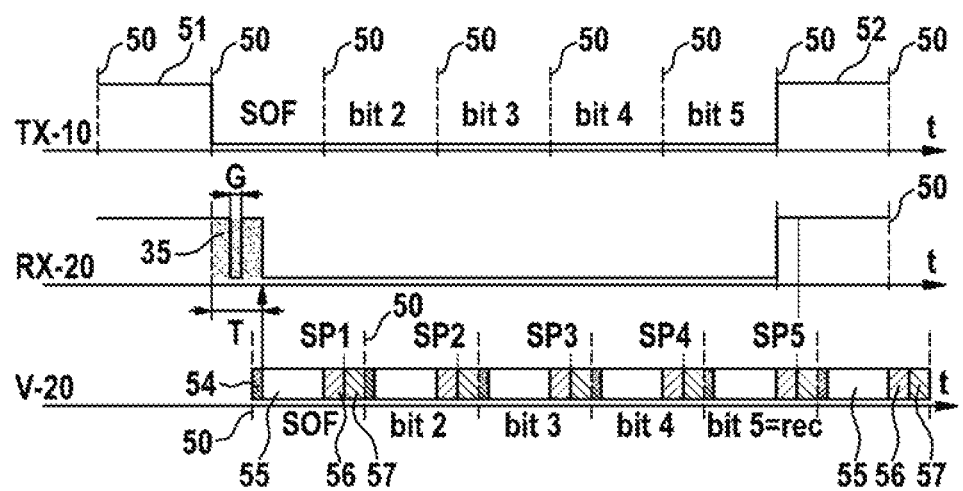
FIG. 7 shows a timing diagram for illustrating the clock ratios between the transmitter and the receiver at the beginning of a transmitted frame in the bus system according to FIG. 1.

FIG. 7 shows as an example the progressions of the sending signal TX-10 of the subscriber station 10, the receiving signal RX-20 of the subscriber station 20 and the sampling view V-20 of the subscriber station 20, in each case over time t. The dashed line in FIG. 7 respectively indicates the bit boundary 50 between individual bits. For reasons of clear illustration, not all of the dashed lines for the bit boundary 50 are provided with reference signs for the receiving signal RX-20 and the sampling view V-20.

Shown in FIG. 7 is the case where an idle bit 51 is initially sent on the bus line 3, before the transmitting signal TX-10 begins with a Start of Frame bit (SOF bit). This is followed by a bit2 to bit5 with the same level as the Start of Frame bit. After the bit5, a stuff bit 52 is inserted.

Accordingly, the receiving signal RX-20 corresponding to the transmitting signal TX-10 is obtained with a delay (not represented), which is caused by the transmission of the transmitting signal TX-10 via the bus line 3. This receiving signal RX-20 may for various reasons (hardware errors, external disturbances, electromagnetic radiation, etc.) have a recessive level for a time period T, although the transmitting signal has a dominant level of the SOF bit. In the thus-falsified receiving signal RX-20 there may additionally be short disturbance pulses G, which falsify the bus signal 35 further, as shown in FIG. 7. Such disturbance pulses G may for example be likewise caused by external disturbances (electromagnetic radiation, etc.) and are possibly (for example if they are shorter than the smallest bus time unit of one time quantum tq) not sensed by the receiving subscriber station, that is to say here the subscriber station 20. The receiving signal RX-20 remains falsified.

On account of the falsified receiving signal RX-20, the subscriber station. 20 sees the signal. V-20. After the bit boundary 50 for the SOF bit there follows a sync_seg phase, provided with the reference sign 54. This is followed by a transmission phase prop_seg, which is provided in FIG. 7 with the reference sign 55. This is followed by a phase_seg1, provided with the reference sign 56, and a phase_seg2, provided with the reference sign 57. The sequence of said phases 54 to 57 is the same for each of the bits.

The subscriber station 20 samples the receiving signal RX-20 at sample points SP1, SP2, SP3, SP4, SP5. The sample points SP1 to SP5 lie between the phase_seg1, provided with the reference sign 56, and the phase_seg2, provided with the reference sign 57.

In the case shown in FIG. 7, the CAN clock in the subscriber stations 10, 20, 30, which are also referred to as nodes, is fRX_nodes==fTX_nodes. That is to say that the receiving clock corresponds to the sending clock. Here, a shortening/falsification of the Start of Frame bit (SOF) of "phase_seg2+ε" is enough to cause the problem being considered here. In the case shown, the fifth sample point SP5 incorrectly gives a recessive value. With 1 Mbit/s and a sample point (SP) for the sample points SP1, SP2, SP3, SP4, SP5 of 80%, a shortening by 250 ns is enough to create the problem being considered here, as described above.

In the case of the present exemplary embodiment, to solve the problem described above, for CRC-17 and CRC-21 the initialization vector "1 . . . 0" may be used instead of "0 . . . 0" as the initialization vector of the CRC generator 13A, 23A, 33A. The initialization may be performed with the verifying devices 12, 22, 32, in the case of the verifying device 22 in particular with the CRC evaluation unit 22A and the insertion unit 22B. As a result, the problems with respect to the two critical values of the identifier bits ID28 to ID25 of "0000" and "0001" can no longer occur.

As a supplementary or alternative solution to the problem being considered, the following procedure is adopted.

If a CRC value of "0 . . . 0" is sensed, a "1" is inserted into the CRC logic in an additional evaluation of the CRC mechanism. This is performed before the evaluation of the next received/sent bit.

In other words, the CRC calculation logic concerned of the CRC generator 13A, 23A, 33A calculates the CRC checksum. If in the continuous calculation carried out by the CRC calculation logic of the CRC generator 13A, 23A, 33A, with the associated verifying device 12, 22, 32, a CRC value of "0 . . . 0" is found, a value "1" is inserted into the CRC calculation logic in an additional evaluation step. In the case of the subscriber station 20, the checking of the CRC value that finds "0 . . . 0" may be carried out with the CRC evaluation unit 22A. The insertion of the value "1" into the CRC calculation logic may be carried out with the insertion unit 223.

This inserted "1" may be regarded as a virtual stuff bit, which is only visible to the CRC logic. On account of this insertion, the CRC value is no longer "0 . . . 0" when the next received/sent bit arrives.

In the case of a second exemplary embodiment, the bus system 1 is constructed in the same way as described in the case of the first exemplary embodiment. As a difference from the latter, however, the second exemplary embodiment is concerned with the problem that can arise if within a CAN FD frame a recessive bit after a series of four sent dominant bits is misinterpreted by the receiver as a stuff bit because of a shortening of a bit or a shift in the synchronization of the subscribers and at the same time the interim CRC register value is coincidentally equal to "0 . . . 0". The interim CRC register value of the CRC generator 13A, 23A, 33A is equal to "0 . . . 0" it the continuously carried out calculation of the CRC checksum gives the value "0 . . . 0".

A distinction should be made between two cases:

Case 2a occurs if the interim CRC register value is equal to "0 . . . 0", while a stuffed sequence of "0"s is sent and the first of these "0" hits is shortened by synchronization. Accordingly, a bit sequence of "00000I" ("I" stands here for a sent stuff bit) is sampled here by the receiver in a falsified form as "00001". This error is not sensed by the CRC.

Case 2b occurs if the interim CRC register value is equal to "0 . . . 0", while a non-stuffed sequence "00001" is sent and the receiver samples an additional "0". Then, the "1" is interpreted as a stuffing "1" and accordingly the sent bit sequence of "00001" is sampled by the receiver in a falsified form as "00000I ("I" stands here for a received—presumed—stuffing bit). This insertion is not sensed by the CRC.

The problem may occur at any bit position between the Start of Frame and the sent CRC checksum. With the initialization vector "1 . . . 0", which is described in the case of the first exemplary embodiment, an interim CRC register value equal to "0 . . . 0" cannot occur for the first 18 sent bits.

As a solution to the problem considered in the case of the second exemplary embodiment, the following procedure is adopted.

If a CRC value of "0 . . . 0" is sensed, a "1" is inserted into the CRC logic in an additional evaluation of the CRC mechanism. This is performed before the evaluation of the next received/sent bit.

In other words, the CRC calculation logic concerned of the CRC generator 13A, 23A, 33A calculates the CRC checksum. If in the continuous calculation carried out by the CRC calculation logic of the CRC generator 13A, 23A, 33A, with the associated verifying device 12, 22, 32, a CRC value of "0 . . . 0" is found, a value "1" is inserted into the CRC calculation logic in an additional evaluation step. In the case of the subscriber station 20, the checking of the CRC value that finds "0 . . . 0" may be carried out with the CRC evaluation unit 22A. The insertion of the value "1" into the CRC calculation logic may be carried out with the insertion unit 22B.

This inserted "1" may be regarded as a virtual stuff bit, which is only visible to the CRC logic.

On account of this insertion, the CRC value is no longer "0 . . . 0" when the next received/sent bit arrives.

All of the refinements described above of the bus system 1, the subscriber stations 10, 20, 30 and the method may be used individually or in all possible combinations. In particular, all of the features of the previously described exemplary embodiments may be combined as desired or be omitted. In addition, the following modifications are conceivable in particular.

The bus system 1 according to the exemplary embodiments that is described above is described on the basis of a bus system based on the CAN FD protocol. The bus system 1 according to the exemplary embodiments may however also be another kind of communication network. It is advantageous, but not an absolute prerequisite, that with the bus system 1 exclusive, collision-free access of a subscriber station 10, 20, 30 to a common channel is ensured, at least for certain time periods.

There may be any desired number and arrangement of the subscriber stations 10 to 30 in the bus system 1 of the exemplary embodiments and any desired modifications thereof. In particular, there may also only be subscriber stations 10 or 20 or 30 in the bus system 1. Any desired combinations of the subscriber stations 10 to 30 in the bus systems 1 are possible.

Instead of the way in which they are configured that is shown in FIG. 1, the verifying devices 12, 22, 32 may also be respectively provided in the associated communication control device 11, 21, 31. There may also be one or more such subscriber stations as an alternative or in addition to the subscriber stations 10, 20, 30 in any desired combination with the subscriber stations 10, 20, 30 in the bus system 1.

The invention claimed is:

1. A method for serial transmission of a frame, the method comprising:
    transmitting the frame from a transmitter to a receiver via a bus line;
    inserting, before the transmitting, stuff bits into the frame with the transmitter according to a predetermined rule to generate additional signal edges;
    removing, after the transmitting, the stuff bits with the receiver in an evaluation of the frame;
    calculating a CRC checksum with a CRC generator, the frame including the CRC checksum; and
    during the calculating of the CRC checksum, inserting a value "1" into the CRC generator in response to an interim CRC register value being equal to "0 . . . 0".

2. The method as claimed in claim 1, wherein the inserting of the value "1" into the CRC generator is carried out before evaluating a next transmitted bit.

3. The method as claimed in claim 1, the calculating of the CRC checksum further comprising:
    initializing the CRC generator with an initial CRC register value equal to "1 . . . 0".

4. The method as claimed in claim 1, wherein at least one of:
    the frame includes a header part, a data part, and an end part; and
    the frame includes a header part having an identifier.

5. The method as claimed in claim 1, wherein the frame is one of a CAN frame, a TTCAN frame, and a CAN FD frame.

6. A subscriber station for a bus system, the subscriber station comprising:
    a transceiver configured to at least one of (i) transmit a frame to and (ii) receive the frame from a further subscriber station of the bus system via a bus line; and
    a controller configured to verify a CRC checksum of the frame, the CRC checksum being calculated by a CRC generator,
    wherein the transceiver is configured to at least one of (i) before transmitting the frame, insert stuff bits into the frame according to a predetermined rule to generate additional signal edges, and (ii) remove the stuff bits from the frame when evaluating the received frame,
    wherein the controller is configured to, during the calculating of the CRC checksum, insert a value "1" into the CRC generator in response to an interim CRC register value being equal to "0 . . . 0".

7. A bus system comprising:
    a bus line; and
    at least two subscriber stations configured to be connected to one another via the bus line such that they can communicate with one another, at least one of the at least two subscriber stations comprising:
        a transceiver configured to at least one of (i) transmit a frame to and (ii) receive the a frame from a further subscriber station of the at least two subscriber stations via the bus line; and
        a controller configured to verify a CRC checksum of the frame, the CRC checksum being calculated by a CRC generator,
        wherein the transceiver is configured to at least one of (i) before transmitting the frame, insert stuff bits into the transmitted frame according to a predetermined rule to generate additional signal edges, and (ii) remove the stuff bits from the frame when evaluating the received frame,
        wherein the controller is configured to, during the calculating of the CRC checksum, insert a value "1" into the CRC generator in response to an interim CRC register value being equal to "0 . . . 0".

* * * * *